US010469011B2

United States Patent
Golden et al.

(10) Patent No.: US 10,469,011 B2
(45) Date of Patent: Nov. 5, 2019

(54) SHORTED ROTATING DIODE PROTECTION FOR SYNCHRONOUS MACHINES

(71) Applicant: HAMILTON SUNDSTRAND CORPORATION, Charlotte, NC (US)

(72) Inventors: Brian R. Golden, DeKald, IL (US); Adrian E. Vandergrift, Rockton, IL (US); John F. Defenbaugh, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 120 days.

(21) Appl. No.: 15/675,090

(22) Filed: Aug. 11, 2017

(65) Prior Publication Data

US 2019/0052204 A1 Feb. 14, 2019

(51) Int. Cl.
*H02P 9/00* (2006.01)
*H02P 9/30* (2006.01)

(52) U.S. Cl.
CPC .............. *H02P 9/006* (2013.01); *H02P 9/302* (2013.01)

(58) Field of Classification Search
CPC .................................. H02P 9/006; H02P 9/302
See application file for complete search history.

(56) References Cited

U.S. PATENT DOCUMENTS

| | | | |
|---|---|---|---|
| 4,486,801 A | 12/1984 | Jackovich et al. | |
| 5,508,601 A | 4/1996 | Good et al. | |
| 6,111,390 A * | 8/2000 | Inaba | H02K 21/046 310/156.26 |
| 6,163,138 A * | 12/2000 | Kohl | H02J 7/245 322/25 |
| 7,268,552 B1 | 9/2007 | Baker | |
| 8,072,191 B2 | 12/2011 | Maddali et al. | |
| 8,134,345 B2 * | 3/2012 | Bray | H02K 19/38 310/52 |
| 9,543,872 B2 * | 1/2017 | Chen | H02P 9/009 |
| 9,543,876 B2 | 1/2017 | Patel et al. | |
| 2004/0052125 A1 * | 3/2004 | Tankard | H02P 9/40 365/200 |

(Continued)

OTHER PUBLICATIONS

European Search Report for European Patent Application No. 18188550 completed Jan. 8, 2019.

*Primary Examiner* — Viet P Nguyen (74) *Attorney, Agent, or Firm* — Carlson, Gaskey & Olds, P.C.

(57) ABSTRACT

An assembly according to an embodiment of the present disclosure includes, among other things, a synchronous machine including a rotating portion and a stationary portion, the rotating portion including at least one rotating diode coupled to a field winding, and the stationary portion including a stator winding and an exciter winding. A control unit includes a first gate and a second gate. The exciter winding is connected in series to the first gate and the second gate during a first operating mode to energize the exciter winding. The exciter winding is electrically connected in series to a first gate but is electrically disconnected from the second gate in a second, different operating mode to electrically disconnect the exciter winding from an exciter energy source. A method of operating a synchronous machine is also disclosed.

13 Claims, 8 Drawing Sheets

(56) References Cited

U.S. PATENT DOCUMENTS

| | | | |
|---|---|---|---|
| 2005/0151515 A1* | 7/2005 | Isurin | H02P 9/305 |
| | | | 322/28 |
| 2009/0058373 A1* | 3/2009 | Graovac | H02P 9/48 |
| | | | 322/25 |
| 2009/0167257 A1* | 7/2009 | Maddali | H02P 9/006 |
| | | | 322/28 |
| 2010/0079117 A1* | 4/2010 | Bekiarov | H02J 7/1438 |
| | | | 322/28 |
| 2011/0193533 A1* | 8/2011 | Koeppl | H02P 9/102 |
| | | | 322/70 |
| 2013/0119948 A1* | 5/2013 | Bekiarov | H02P 9/48 |
| | | | 322/24 |
| 2013/0128394 A1* | 5/2013 | Spannhake | H02P 9/10 |
| | | | 361/33 |
| 2014/0176087 A1* | 6/2014 | Mouni | H02P 9/102 |
| | | | 322/59 |

* cited by examiner

SHORTED ROTATING DIODE PROTECTION FOR SYNCHRONOUS MACHINES

BACKGROUND

This disclosure relates generally to synchronous machines, and more specifically to protection or isolation of circuitry during operation.

Synchronous machines are known. Synchronous machines include a stationary portion and a rotating portion, where the rotating portion and the stationary portion each have at least one winding. One application of synchronous machines is a generator arrangement for gas turbine engines to power the various components of the engine and/or aircraft.

The synchronous machine includes a field winding on the rotating portion and an armature winding on the stationary portion. Current supplied to the field winding generates a magnetic field between the rotating portion and the stationary portion, causing current to be generated at the armature winding. The rotating portion typically includes one or more rotating diodes to rectify current to the field winding. During operation of the synchronous machine, one of the rotating diodes may become shorted or otherwise malfunction, sometimes referred to as a "shorted rotating diode" (SRD). In some arrangements, one or more portions of the stationary portion are electrically isolated from the SRD during an SRD event.

SUMMARY

An assembly engine according to an example of the present disclosure includes a synchronous machine including a rotating portion and a stationary portion, the rotating portion including at least one rotating diode coupled to a field winding, and the stationary portion including a stator winding and an exciter winding, and a control unit including a first gate and a second gate. The exciter winding is connected in series to the first gate and the second gate during a first operating mode to energize the exciter winding. The exciter winding is electrically connected in series to a first gate but is electrically disconnected from the second gate in a second, different operating mode to electrically disconnect the exciter winding from an exciter energy source.

A synchronous machine and a method of operating a synchronous machine are also disclosed.

The various features and advantages of disclosed embodiments will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

The disclosed embodiments of a synchronous machine include a rotating rectifier protection circuit that is operable to electrically isolate components of the synchronous machine in response to an SRD event that may occur due to a faulty rotating diode.

Figure 1:
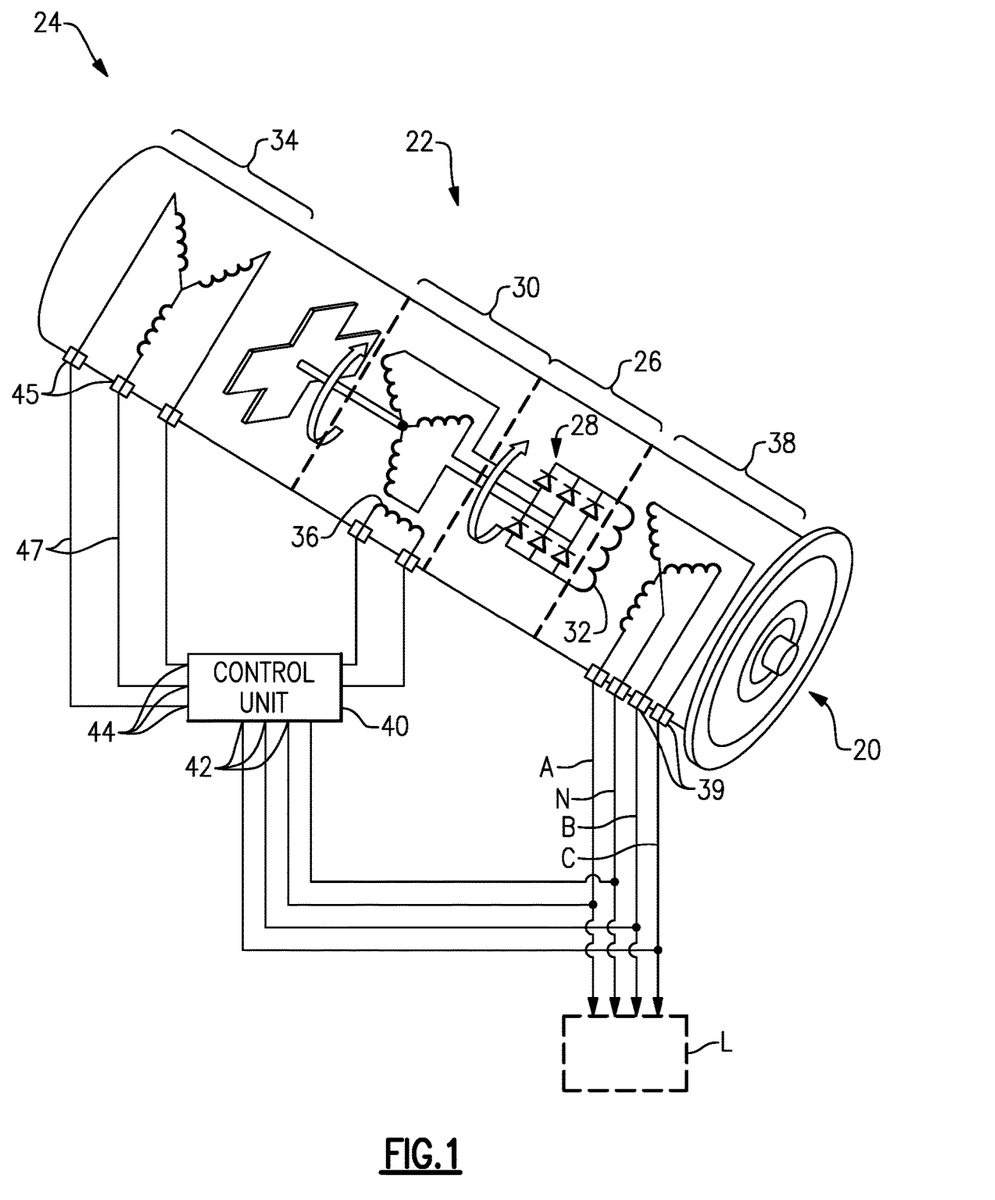
FIG. 1 illustrates a synchronous machine.

FIG. 1 illustrates a synchronous machine 20 that may be utilized to generate power. The synchronous machine 20 includes a rotating portion 22 and a stationary portion 24 that is arranged at least partially about the rotating portion 22 to define an air gap. The rotating portion 22 includes a rotating rectifier 26 having one or more rotating diodes 28 (three pairs of diodes shown) coupled between one or more main rotor windings 30 and a rotating field winding 32. A supply of current from the main rotor windings 30 is communicated to the rotating rectifier 26 to convert AC current to DC current, for example, which is supplied to the rotating field winding 32.

The stationary portion 24 includes an exciter energy source such as a permanent magnet generator (PMG) 34. In other examples, the exciter energy source is a flux switching generator. The stationary portion 24 also includes an exciter winding 36 and one or more main stator windings 38. Although main rotor windings 30, PMG 34 and stator windings 38 are depicted as having three-phase windings, fewer or more than three phases can be utilized with the teachings herein, such as single-phase or two-phase arrangements. Additionally, although exciter winding 36 is depicted as having a single winding, more than one winding can be utilized, such as an exciter having three-phase windings. In the illustrated example of FIG. 1, PMG 34 is depicted as a full-wave arrangement (i.e., no neutral). In other examples, the PMG 34 comprises a half-wave arrangement (i.e., phases A, B, C and neutral). The PMG 34 may be a portion of another synchronous machine, and supplies an amount of current to the exciter winding 36.

During operation in a generator mode, a rotating magnetic field is generated by supplying current to the rotating field winding 32 which generates a rotating magnetic field to induce current in the main stator windings 38 in response to relative rotation of the rotating and stationary portions 22, 24. The induced current may be supplied to one or more loads L (one shown in dashed lines for illustrative purposes). Example loads L can include engine controls, actuators and auxiliary systems of an aircraft.

The synchronous machine 20 includes a generator control relay or unit 40 provided with a rotating rectifier protection circuit. The control unit 40 is operable to control exciter winding 36 to selectively induce a current in, or otherwise energize, main rotor windings 30 in order to generate a magnetic field between rotating field winding 32 and stator windings 38. The control unit 40 has a first set of inputs 42 relating to each of three phases A-C and neutral N carried on output terminals 39 of the main stator windings 38, a second set of inputs 44 for windings of the PMG 34. The inputs 44 are coupled to one or more output terminals 45 of the PMG 34 via phase lines 47.

Figure 2A:
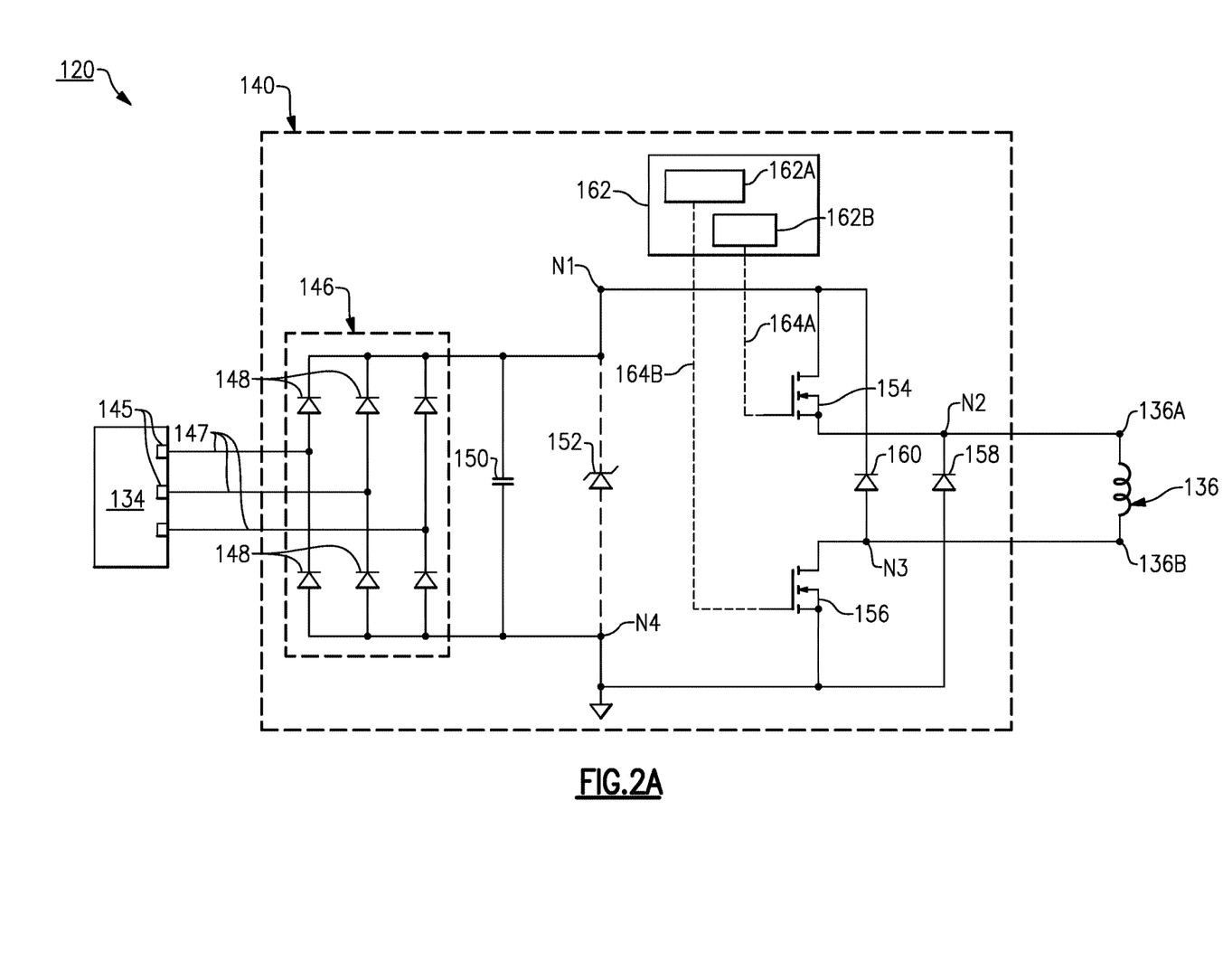
FIG. 2A illustrates a control unit according to a first embodiment.

FIG. 2A illustrates details of an exemplary control unit 140. In this disclosure, like reference numerals designate like elements where appropriate and reference numerals with the addition of one-hundred or multiples thereof designate modified elements that are understood to incorporate the same features and benefits of the corresponding original elements.

Figure 5:
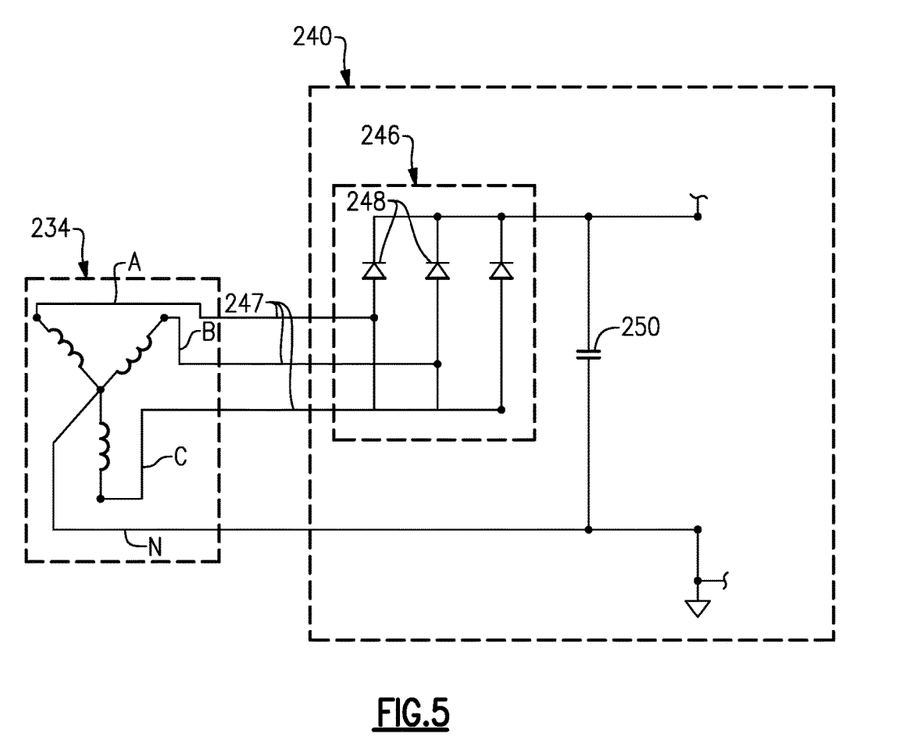
FIG. 5 illustrates a control unit according to a second embodiment.

The control unit 140 includes a bridge rectifier 146. The rectifier 146 can include one or more pairs of diodes 148 coupled to respective output terminals 145 of the PMG 134 via phase lines 147. The PMG 134 supplies voltage to the rectifier 146, which rectifies AC current carried on phase lines 147 to DC current. The rectifier 146 communicates the DC current to exciter winding 136. In the illustrated example of FIG. 2A, the PMG 134 is a three-phase generator with phase lines 147 each coupled to respective pairs of diodes 148 of the rectifier 146. In the alternative example of FIG. 5, control unit 240 is arranged with rectifier 246 including three diodes 248, with phase lines 247 coupling phases A, B, C to respective diodes 248, and a neutral line N of PMG 234 connected to ground.

The rectifier 146 is arranged in parallel with a capacitor 150. The exciter winding 136 is connected in parallel with the rectifier 146 and with the capacitor 150. In some examples, the rectifier 146 can be arranged in parallel with a transient-voltage-suppression (TVS) diode 152 (connections shown in dashed lines), sometimes referred to as a "transorb." TVS diodes can be utilized to "clamp" or otherwise maintain voltage within a desired range or value. The capacitor 150 and TVS diode 152 can be utilized to protect or isolate circuitry of the control unit 140 during an SRD event, as discussed in more detail below. In other examples, the circuitry of the control unit 140, including between PMG 134 and exciter winding 136, is free of any TVS diodes. Omission of TVS diodes can reduce system complexity, size, and cost, for example.

The control unit 140 includes a first switch or gate 154 and a second switch or gate 156. The control unit 140 also includes a first diode 158 and a second diode 160. In the illustrated example of FIG. 2A, the first gate 154 and the second gate 156 are NMOS transistors. Other transistors, including other types of field-effect transistors (FET) and bipolar junction transistors, and other types of switch logic may also be utilized.

The control unit 140 is arranged to define a plurality of nodes. The nodes include at least a first node N1, a second node N2, a third node N3, and a fourth node N4. In some examples, components of the first node N1 comprise the rectifier 146, the capacitor 150, the TVS diode 152, a drain terminal of the first gate 154, and a cathode of the second diode 160. In other examples, the circuitry of the control unit 140 is free of any TVS diodes such that the first node N1 consists of the rectifier 146, the capacitor 150, the drain terminal of the first gate 154, and the cathode of the second diode 160.

Components of the second node N2 comprise a first terminal 136A of the exciter winding 136, a cathode of the first diode 158, and a source terminal of the first gate 154. Components of the third node N3 comprise a second terminal 136B of the exciter winding 136, an anode of the second diode 160, and a drain terminal of the second transistor or gate 156. Components of the fourth node N4 include the rectifier 146, the capacitor 150, a source terminal of the second gate 156, and an anode of the first diode 158. In the illustrated example of FIG. 2A, node N4 is coupled to ground (shown schematically). In other examples, the ground (shown schematically) at node N4 is omitted.

The control unit 140 includes a gate drive 162 that is operable to independently control each of the first and second gates 154, 156. The gate drive 162 includes a first drive module 162A and a second drive module 162B. The first drive module 162A is electrically coupled to the first gate 154 via a first gate drive signal line 164A, and the second drive module 162B is electrically coupled to the second gate 156 via a second gate drive signal line 164B.

The gate drive 162 is programmed with control logic to independently modulate each of the first and second gates 154, 156. In a prior arrangement, a gate drive communicated a single signal to two gates such that the gates operated together in the same opened and closed states. The gate drive 162 can include a processor and memory, for example. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data for operation of the control unit 140 as described herein. In other examples, the gate drive 162 may comprise one or more digital and/or analog electrical devices to provide the desired solution.

The control unit 140 is operable to simultaneously output and communicate a first gate signal carried on the first gate drive signal line 164A to the first gate 154 and a second, different gate signal carried on the second gate drive signal line 164B to the second gate 156 to independently move each of the gates 154, 156 between open and closed states. Each of the first and second gate signals may comprise "low" and "high" signals (or values). The low and high signals may correspond to insufficient and sufficient voltage (or current), respectively, to cause the respective gate 154, 156 to conduct current. The control unit 140 can also hold each of the first and second gates 154, 156 in a desired state. The first and second gates 154, 156 can define at least four mutually exclusive states (or switch conditions), including ON/ON, ON/OFF, OFF/ON and OFF/OFF, which may correspond to predetermined voltage and/or current values or thresholds. The first and second drive modules 162A, 162B can modulate the first and second gates 154, 156 to control the voltage at the output terminals 39 of the stator windings 38 (FIG. 1) within a desired range or value.

Figure 2B:
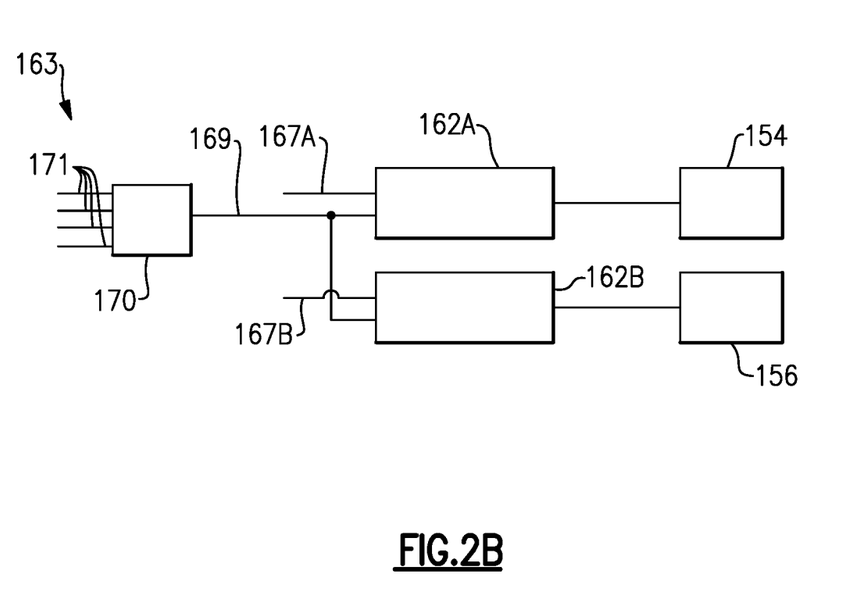
FIG. 2B illustrates exemplary gate drive logic of the control unit of FIG. 2A.

FIG. 2B illustrates exemplary gate drive logic 163 for the gate drive 162 of control unit 140 of FIG. 2A. Each of the first and second drive modules 162A is coupled to a respective enable signal line 167A, 167B to enable or disable the respective first and second gates 154, 156. Each of the first and second drive modules 162A is coupled to a modulation line 169. A point of regulation (POR) sensing module 170 is operable to sense a condition of such as voltage or current carried on POR lines 171. The POR lines 171 may correspond to each of three phases A-C and neutral N carried on output terminals 39 of the main stator windings 38 (FIG. 1), for example. The POR sensing module 170 is operable to generate a pulse width modulation (PWM) signal that is carried on the modulation line 169 to cause the exciter 136 to vary a desired voltage and/or current output of the synchronous machine 20.

The gate drive 162 can be operable to detect an SRD event. Techniques for detection of an SRD event can include voltage or ripple detection, for example. In some examples, detection of an SRD event can include measuring voltage and/or current at one or more of the nodes of the control unit 140, such as the first, second and/or third nodes N1, N2, N3. The gate drive 162 may be coupled to one or more sensors that observe voltage and/or current at one or more of the nodes, and may compare the observed values to a predetermined range or threshold to determine whether an SRD event has occurred, for example. The observed values may correspond to a build-up of voltage in the control unit 140 across the rectifier 146, for example. In other examples, the gate drive 162 receives an indication that an SRD event has occurred from another portion of the synchronous machine 120 or another device.

An SRD event can be caused by at least one of the rotating diodes 28 of the rotating rectifier 26 (FIG. 1), such as failure or deviation from a defined operating characteristic of the respective rotating diode 28. During an SRD event, the first and second gates 154, 156 may be opened to move the synchronous machine 120 from an ON state to an OFF state. The SRD can cause current to be induced back into the exciter winding 136. This can cause voltages in the control unit 140 to build-up or otherwise increase. In the illustrated example, the capacitor 150 can absorb some voltage, but the voltage may continue to build up beyond a desired threshold. The TVS diode 152 can be utilized to clamp or otherwise maintain the voltage within a desired range. Prolonged inducement of current back into the exciter winding 136 may cause the TVS diode 152 to fail, however. TVS diodes can be omitted from the circuitry of the control unit 140 by incorporation of the gate drive 162 utilizing the techniques disclosed herein.

Figure 3A:
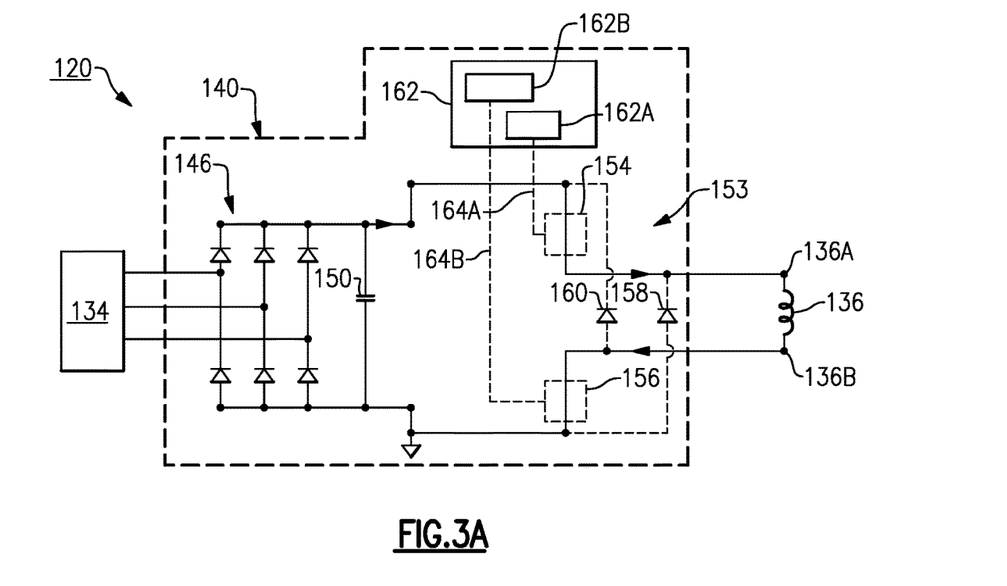
FIG. 3A illustrates the control unit of FIG. 2A in a first operating mode.
Figure 3B:
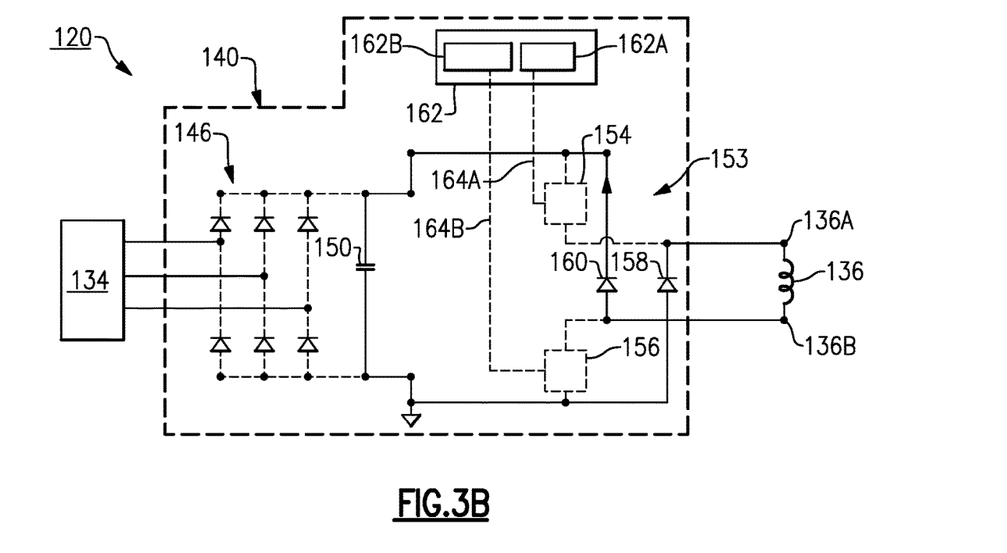
FIG. 3B illustrates the control unit of FIG. 2A in a second operating mode.
Figure 3C:
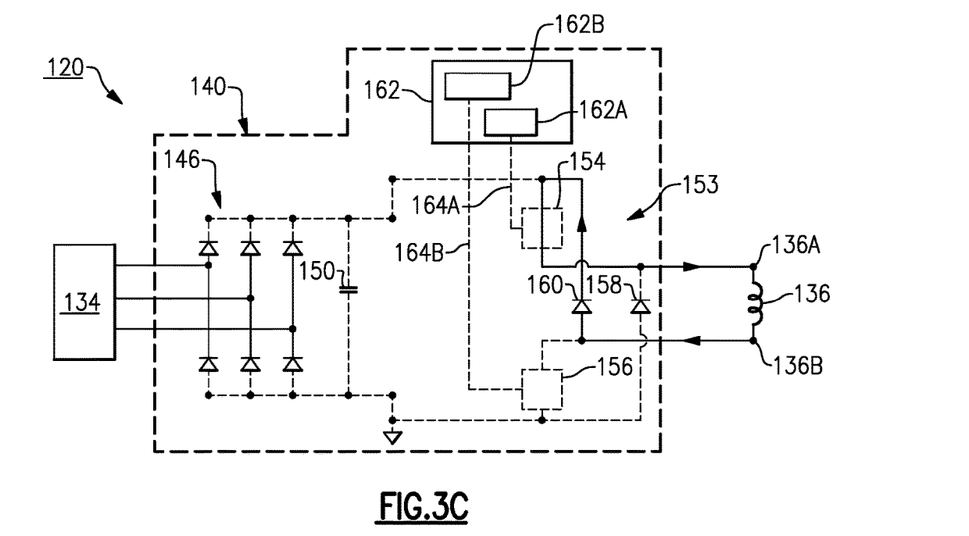
FIG. 3C illustrates the control unit of FIG. 2A in a third operating mode.

FIGS. 3A-3C illustrate the control unit 140 in various operating states or modes, with electrical connectivity or paths shown in solid lines and electrically disconnected portions or paths of the control unit 140 shown in dashed lines.

Figure 4:
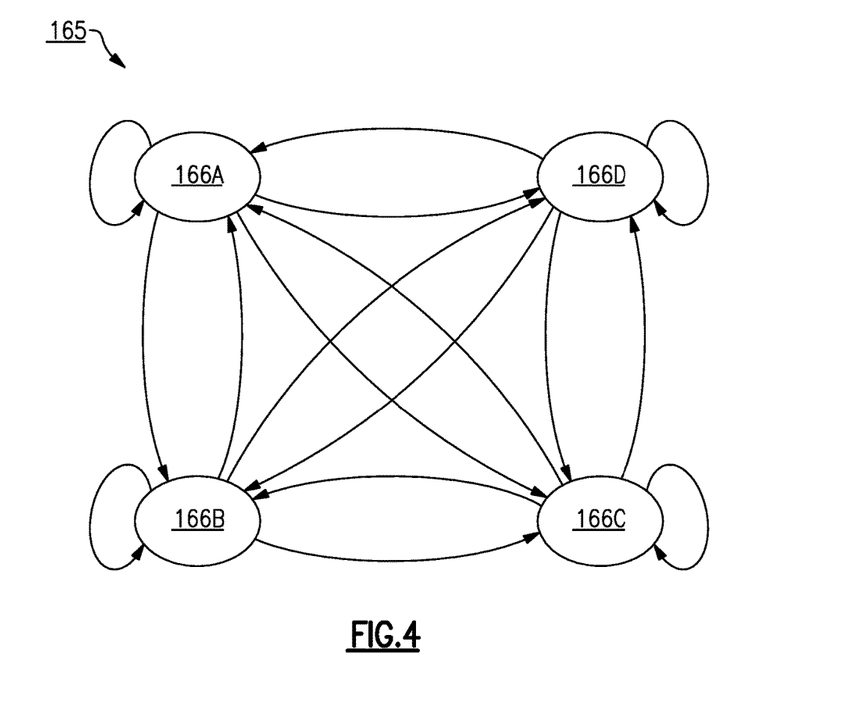
FIG. 4 illustrates a state diagram for a control unit.

FIG. 4 shows an example state diagram 165 illustrating various operating modes of the control unit 140. In the illustrated example of FIG. 4, the operating modes include at least a first operating mode 166A, a second operating mode 166B, and a third operating mode 166C. In the illustrated example, the first operating mode 166A may correspond to the open and closed electrical connections illustrated in FIG. 3A. The second operating mode 166B may correspond to the open and closed electrical connections illustrated in FIG. 3B, and the third operating mode may correspond to the open and closed electrical connections illustrated in FIG. 3C. The control unit 140 includes a fourth operating mode 166D in which the exciter energy source, such as the PMG 134, is in an off state to de-energize the exciter 136 during normal operation. In the illustrated example of FIG. 4, the first, second, third and fourth operating modes 166A-166D are mutually exclusive. The POR sensing module 170 is operable to cause the exciter 136 to transition between each of the operating modes 166A, 166B, 166C and 166D in response to the respective values of signals carried on lines 167A, 167B and/or 169 (FIG. 2B).

In the illustrated example of FIG. 3A, the control unit 140 is shown in the first operating mode 166A. The first and second drive modules 162A, 162B output respective first and second gate signals to cause the first and second gates 154, 156 to close. The first and second gates 154, 156 cause the PMG 134 to be electrically connected to the exciter winding 136, with the exciter winding 136 electrically in parallel with the rectifier 146 and the capacitor 150. The first and second gates 154, 156 are electrically connected in series with the exciter winding 136, and the first and second diodes 158, 160 are electrically disconnected from the exciter winding 136. The control unit 140 causes the exciter winding 136 to energize, thereby causing the rotating field winding 32 to induce a current in the main stator windings 38 (FIG. 1).

In the illustrated example of FIG. 3B, the control unit 140 is shown in the second operating mode 166B. The first and second drive modules 162A, 162B output respective first and second gate signals to cause the first and second gates 154, 156 to open. The first and second gates 154, 156 cause the PMG 134 to be electrically decoupled or disconnected from the exciter winding 136, which can cause the exciter winding 136 to de-energize the rotating portion 22 (FIG. 1) after a period of time. The capacitor 150 may absorb some energy that is communicated back from the exciter winding 136. The first and second diodes 158, 160 are electrically connected in series with the exciter winding 136, and the first and second gates 154, 156 are electrically disconnected from the exciter winding 136.

To control the voltage observed by the load L (FIG. 1), the control unit 140 may move between the first and second operating modes 166A, 166B to pulse-width modulate the exciter winding 136. The first and second operating modes 166A, 166B may correspond to normal operation of the synchronous machine 120, for example. For the purposes of this disclosure, the term "normal" means a condition in which an SRD event has not occurred.

In the illustrated example of FIG. 3C, the control unit 140 is shown in the third operating mode 166C. The control unit 140 may cause the synchronous machine 120 to enter into the third operating mode 166C in response to occurrence of an SRD event. The third operating mode 166C may correspond to a failure mode of the control unit 140 or synchronous machine 120, for example. For the purposes of this disclosure, the term "failure" means a condition in which an SRD event has occurred.

In the third operating mode 166C, the first drive module 162A output respective first and second gate signals to cause the first gate 154 to close, and the second drive module 162B causes the second gate 156 to open. The control unit 140 causes the PMG 134 and rectifier 146 to be electrically decoupled or disconnected from the exciter winding 136 in response to closing the first gate 154 and opening the second gate 156, which can provide isolation or protection of components of the control unit 140 from voltage increases that may be caused by the SRD. The second diode 160 and the first gate 154 are electrically connected in series with the exciter winding 136, the first diode 158 and the second gate 156 are electrically disconnected from the exciter winding 136, and the exciter winding 136 is disconnected from the PMG 134.

In the third operating mode 166C, current is looped back to the exciter winding 136, bypassing the rectifier 146 and the capacitor 150. The rectifier 146 and capacitor 150 are electrically isolated from energy that is communicated back from the exciter winding 136, which prevents or otherwise reduces the amount of energy build-up in the capacitor 150. This can reduce the sizing requirements of the capacitor 150 and reduce system complexity. Also, TVS diodes can be omitted from the circuitry of the control unit 140, which can reduce system weight and complexity. The first and second drive modules 162A, 162B may hold the first and second gates 154, 156 in their respective closed and open states until the synchronous machine 120 is serviced, for example.

Figure 6:
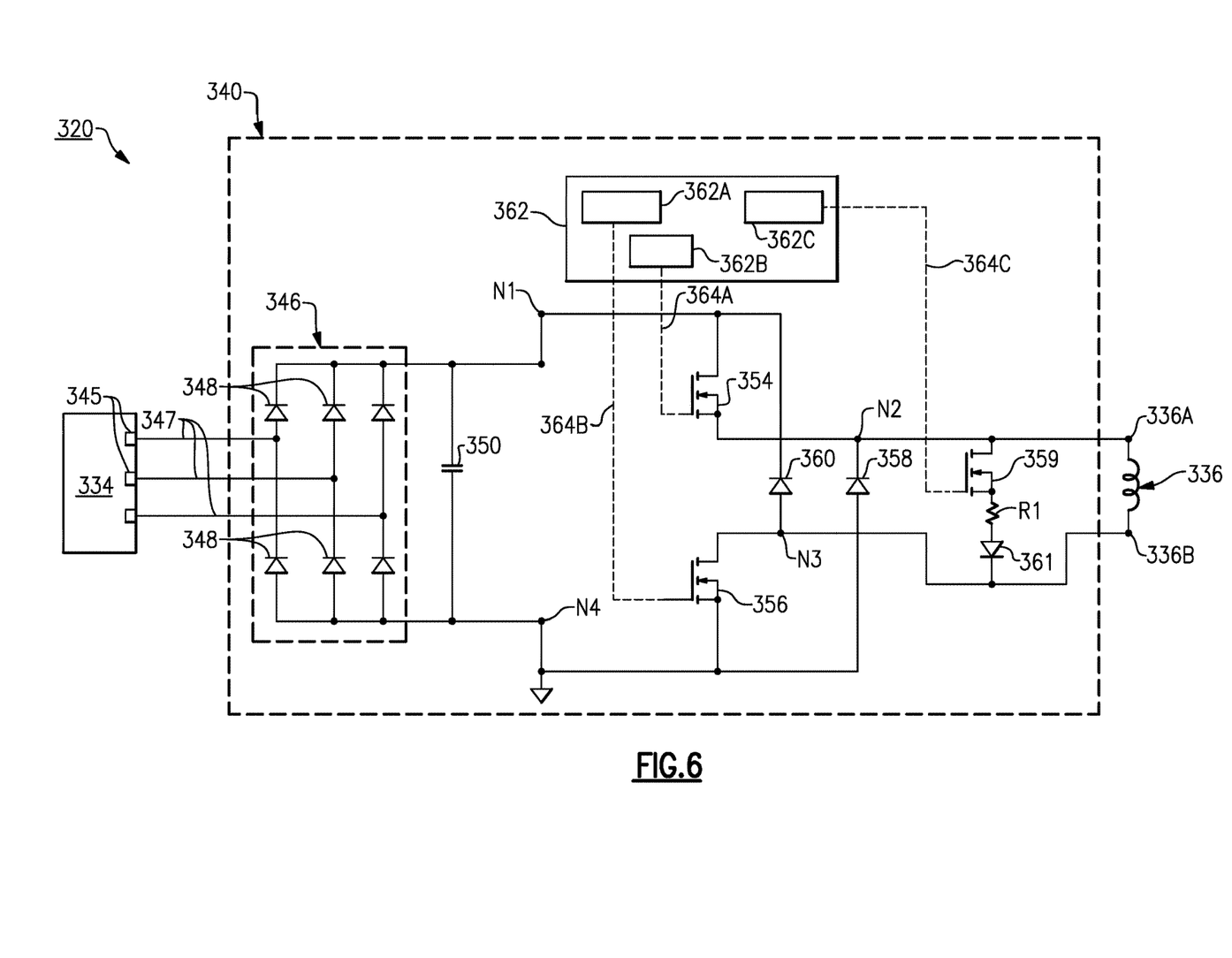
FIG. 6 illustrates a control unit according to a third embodiment.

FIG. 6 illustrates a control unit 340 according to a third embodiment. The control unit 340 includes a third transistor or gate 359 in series with a resistance R1 (e.g., about 10 ohms) and a third diode 361. The third gate 359, resistance R1 and third diode 361 are connected between nodes N2 and N3. Gate drive 362 can include a third drive module 362C electrically coupled to the third gate 359 via a third gate drive signal line 364C to modulate the third gate 359 between open and closed states. The third gate 359 will be in the open state when the control unit 340 is switching normally between the first and second operating modes 166A, 166B (FIG. 4). The third diode 361 prevents a body diode of the third gate 359 from conducting during normal operation off time. The gate drive 362 is operable to cause the third gate 359 to close in the third operating mode 166C, and thereby cause at least a portion of the current to flow through the resistance R1.

Figure 7:
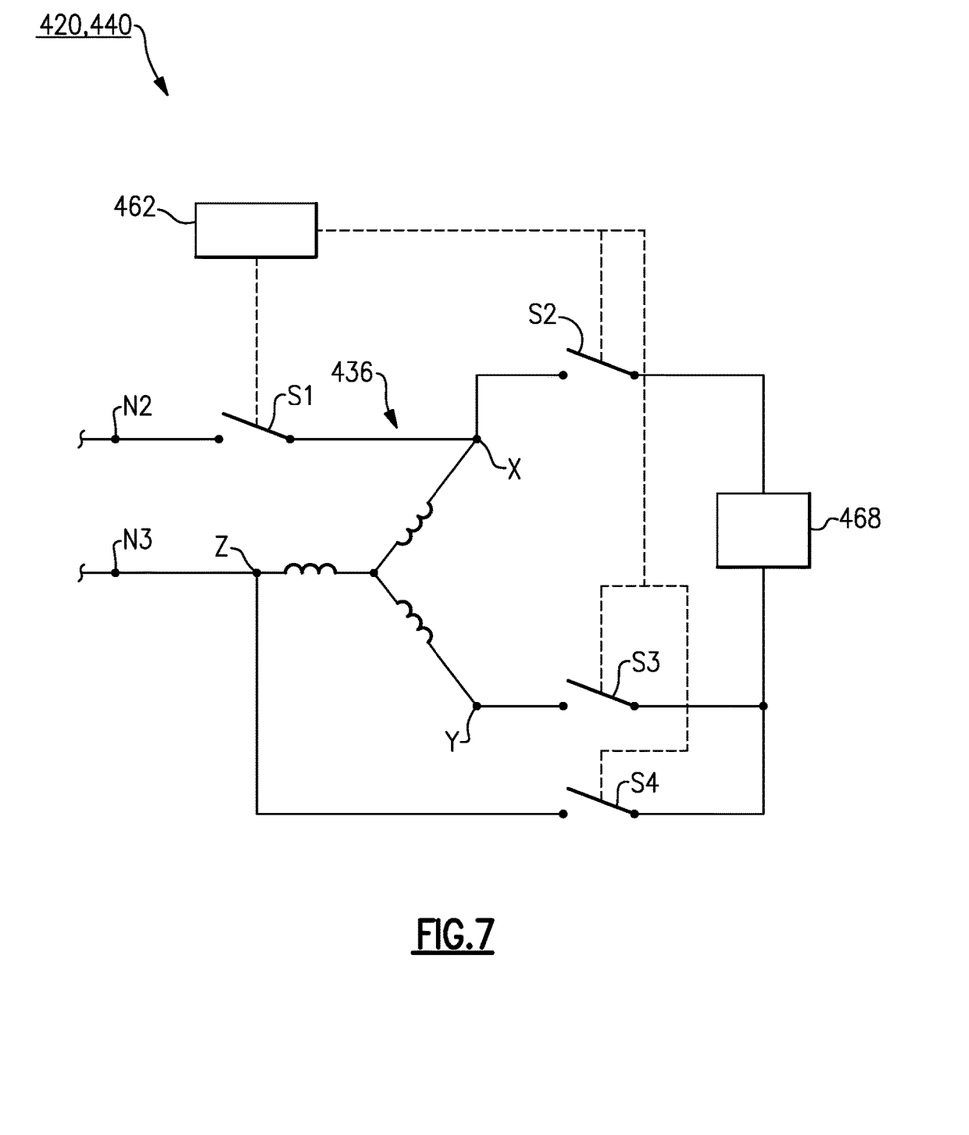
FIG. 7 illustrates a control unit according to a fourth embodiment.

FIG. 7 illustrates a control unit 440 according to a fourth embodiment. In the illustrated embodiment of FIG. 7, synchronous machine 420 is configured to have a generator mode and a starter mode. The synchronous machine 420 includes a three-phase exciter windings 436 including phases X, Y and Z. During the generator mode, the gate drive 462 causes switch S1 to close and switches S2-S4 to open to electrically couple phases X and Z of the exciter windings 436 to an exciter energy source (e.g., PMG 134 of FIG. 2A) via nodes N2 and N3. During the starter mode, the gate drive 462 causes switches S2-S4 to close and switch S1 to open to electrically couple phases X, Y and Z of the exciter windings 436 to a second exciter energy source 468. The second exciter energy source 468 can be operable to supply a quantity of three-phase alternating current, for example.

Although the different examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An assembly comprising:
    a synchronous machine including a rotating portion and a stationary portion, the rotating portion including at least one rotating diode coupled to a field winding, and the stationary portion including a stator winding and an exciter winding;
    a control unit including a first gate and a second gate;
    wherein the exciter winding is connected in series to the first gate and the second gate during a first operating mode to energize the exciter winding; and
    wherein the exciter winding is electrically connected in series to the first gate but is electrically disconnected from the second gate in a second, different operating mode to electrically disconnect the exciter winding from an exciter energy source;
    wherein the control unit includes a first diode and a second diode;
    wherein the first diode and the second diode are electrically disconnected from the exciter winding during the first operating mode;
    wherein the second diode is electrically connected to the exciter winding, and the first diode is electrically disconnected from the exciter winding during the second operating mode;
    wherein the first diode and the second diode are electrically connected in series to the exciter winding during a third, different operating mode;
    wherein the exciter energy source is electrically disconnected from the exciter winding in the third operating mode;
    wherein the exciter energy source is electrically disconnected from the exciter winding in response to closing the first gate and opening the second gate during the second operating mode;
    wherein the control unit includes a bridge rectifier that electrically connects the exciter winding to the exciter energy source during the first operating mode;
    wherein the exciter winding is electrically in parallel with the bridge rectifier and with a capacitor during the first operating mode;
    wherein the capacitor and the bridge rectifier are electrically disconnected from the exciter winding during the second operating mode;
    wherein the exciter energy source is a three-phase generator including phase lines each electrically coupled to a respective pair of diodes of the bridge rectifier;
    wherein the first gate and the second gate are transistors;
    wherein the control unit includes a third gate electrically connected in series with the first gate, a resistance and a third diode during the second operating mode;
    wherein the exciter winding is electrically connected in parallel with the third gate, the resistance and the third diode during the second operating mode; and
    wherein the third gate is electrically disconnected from the exciter winding during the first operating mode and during the third operating mode.

2. The assembly as recited in claim 1, wherein circuitry between the exciter energy source and the exciter winding is free of any transient voltage suppression diodes.

3. The assembly as recited in claim 1, wherein the control unit is operable to simultaneously communicate a first gate signal to the first gate and a second, different gate signal to the second gate.

4. The assembly as recited in claim 3, wherein the control unit is operable to hold closed the first gate during the second operating mode, and is operable to hold open the second gate during the second operating mode.

5. The assembly as recited in claim 4, wherein the second operating mode relates to a shorted rotating diode event caused by the at least one rotating diode.

6. The assembly as recited in claim 1, wherein the second operating mode relates to a shorted rotating diode event caused by the at least one rotating diode.

7. A synchronous machine comprising:
    a rotating portion including at least one rotating diode coupled to a field winding;
    a stationary portion including a stator winding, an exciter winding, a bridge rectifier coupled to a permanent magnet generator, a capacitor, and a plurality of nodes, the plurality of nodes including a first node, a second node, a third node and a fourth node;
    a control unit including a first gate, a second gate, a third gate, a first diode, a second diode, and a third diode;
    wherein components of the first node consist of the bridge rectifier, the capacitor, a drain terminal of the first gate, and a cathode of the second diode;
    wherein components of the second node comprise a first terminal of the exciter winding, a cathode of the first diode, a source terminal of the first gate, and a drain terminal of the third gate;

wherein components of the third node comprise a second terminal of the exciter winding, an anode of the second diode, a drain terminal of the second gate, and a cathode of the third diode;

wherein components of the fourth node comprise the bridge rectifier, the capacitor, a source terminal of the second gate, and an anode of the first diode;

wherein the exciter winding is electrically connected in series to the first gate and the second gate during a first operating mode to energize the exciter winding;

wherein the exciter winding is electrically connected in series to the first gate, but is electrically disconnected from the second gate during a second, different operating mode to electrically disconnect the exciter winding from the permanent magnet generator;

wherein the first diode and the second diode are electrically connected in series to the exciter winding during a third, different mode;

wherein the third gate is electrically connected in series with the first gate, a resistance and the third diode during the second operating mode;

wherein the exciter winding is electrically connected in parallel with the third gate, the resistance and the third diode during the second operating mode; and wherein the third gate is electrically disconnected from the exciter winding during the first operating mode and during the third operating mode.

8. A method of operating a synchronous machine, comprising:

closing first and second gates to energize an exciter winding in series between the first and second gates in a first operating mode;

opening the second gate, but closing the first gate to electrically disconnect to the exciter winding from a rectifier in a second operating mode in response to a shorted rotating diode event, wherein the rectifier is coupled to an exciter energy source;

opening the first and second gates in a third operating mode to electrically disconnect the exciter winding from the exciter energy source;

wherein a first diode and a second diode are electrically connected in series to the exciter winding during the third operating mode;

closing a third gate in the second operating mode such that the third gate is electrically connected in series with the first gate, a resistance and a third diode;

wherein the exciter winding is electrically connected in parallel with the third gate, the resistance and the third diode during the second operating mode; and wherein the third gate is electrically disconnected from the exciter winding during the first operating mode and during the third operating mode.

9. The method as recited in claim 8, wherein the first gate and the second gate are transistors.

10. The method as recited in claim 9, wherein circuitry between the exciter energy source and the exciter winding is free of any transient voltage suppression diodes.

11. The method as recited in claim 9, wherein phase lines of the exciter energy source are each coupled to a respective pair of diodes of the rectifier.

12. The method as recited in claim 8, wherein the step of closing the first and second gates includes electrically connecting in parallel a capacitor with the exciter winding and the rectifier.

13. The method as recited in claim 12, wherein the step of opening the second gate includes electrically connecting the first diode in series with the first gate and the exciter winding in the second operating mode.

\* \* \* \* \*